A. UMHOLTZ.
SCREW.
APPLICATION FILED JAN. 9, 1909.

933,865. Patented Sept. 14, 1909.

UNITED STATES PATENT OFFICE.

AUGUSTUS UMHOLTZ, OF MAGNOLIA, NEW JERSEY.

SCREW.

933,865. Specification of Letters Patent. Patented Sept. 14, 1909.

Application filed January 9, 1909. Serial No. 471,383.

*To all whom it may concern:*

Be it known that I, AUGUSTUS UMHOLTZ, a citizen of the United States, residing at Magnolia, in the county of Camden and State of New Jersey, have invented certain new and useful Improvements in Screws, of which the following is a specification.

My invention relates to improvements in screws, and more particularly to wood screws, the object of the invention being to so construct the head of the screw, that the head will afford the maximum of resistance against the indrawing of the head by the threads of the screw, and hence securely bind the wood back of the head.

With this object in view, the invention consists in a screw having a head of annular stepped formation, providing a series of annular flat faces to bear against the wood.

Figure 1:
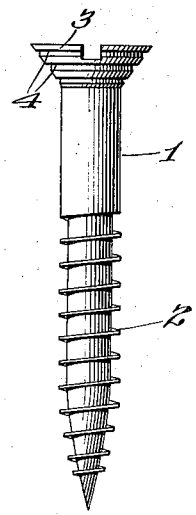
Figure 2:
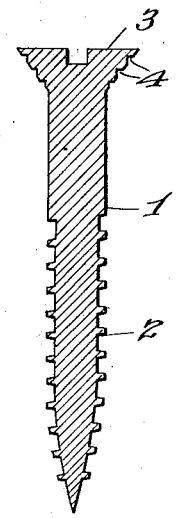
Figure 3:
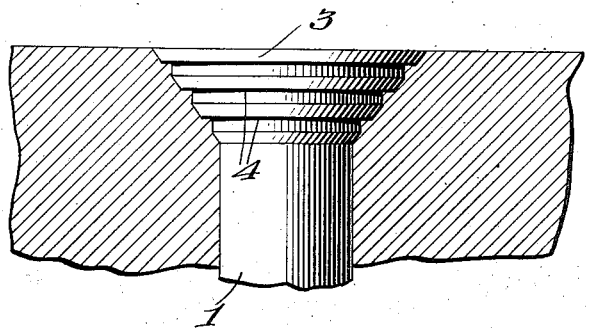

In the accompanying drawings, Figure 1, is a view in elevation illustrating my improvements. Fig. 2, is a view in longitudinal section, and Fig. 3, is an enlarged view of the screw head when forced into the wood.

1 represents the shank of the screw having the ordinary screw threads 2, and provided with my improved head 3. This head 3 is so shaped as to form a series of annular flat faces 4. In other words, the head of the screw has a general stepped formation to resist inward movement of the head in the wood, and compel the threads to exert great power, and tightly press the wood between the threads and the head.

In soft wood, the head of the screw would countersink itself, but would afford a great amount of resistance to such countersinking, and hence effectually bind the wood. In hard wood, a countersinking tool would have to be employed, but this would not prevent the flat faces or stepped form of the head from holding back the inward movement of the head, and hence tightly binding the wood.

I am aware that screw heads have been made with grooves, but such grooving and shaping of the heads has been to accelerate the countersinking of the head, whereas the purpose of my construction is to oppose the countersinking and compel greater clamping power on the screw threads to draw the head in the wood.

Having thus described my invention what I claim as new and desire to secure by Letters Patent is:

As an article of manufacture, a screw having a head of general tapering form thereon, and formed with a series of annular grooves, one wall of each groove extending in lines at exact right angles to the longitudinal axis of the screw, the other walls of said grooves extending in lines parallel with the longitudinal axis of the screw, and the portions between said grooves beveled, substantially as set forth.

In testimony whereof I have signed my name to this specification in the presence of two subscribing witnesses.

AUGUSTUS UMHOLTZ.

Witnesses:
HARRY P. UMHOLTZ,
MARY J. UMHOLTZ.